United States Patent
Yamasaki et al.

(10) Patent No.: US 6,698,236 B2
(45) Date of Patent: Mar. 2, 2004

(54) REFRIGERANT CYCLE SYSTEM AND CONDENSER

(75) Inventors: Kurato Yamasaki, Kariya (JP); Shigeki Ito, Okazaki (JP); Teruyuki Hotta, Nagoya (JP); Atsushi Inaba, Okazaki (JP); Yasushi Yamanaka, Nakashima-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/388,306

(22) Filed: Mar. 13, 2003

(65) Prior Publication Data
US 2003/0177783 A1 Sep. 25, 2003

(30) Foreign Application Priority Data

Mar. 22, 2002 (JP) .......................... 2002-081275

(51) Int. Cl.[7] .............................. F25B 39/04
(52) U.S. Cl. ......................... 62/509; 62/512
(58) Field of Search ................. 62/509, 512, 515; 165/110

(56) References Cited

U.S. PATENT DOCUMENTS

| | | | |
|---|---|---|---|
| 4,580,415 A | * | 4/1986 | Sakuma et al. ............. 62/502 |
| 5,228,315 A | | 7/1993 | Nagasaka et al. |
| 5,651,265 A | | 7/1997 | Grenier |
| 6,032,473 A | | 3/2000 | Morimoto et al. |
| 6,267,173 B1 | | 7/2001 | Hu et al. |
| 6,427,480 B1 | | 8/2002 | Ito et al. |

FOREIGN PATENT DOCUMENTS

| | | |
|---|---|---|
| EP | 0 960 755 A1 | 12/1999 |
| FR | 2750761 | 1/1998 |
| FR | 2757610 | 6/1998 |
| JP | A-S58-987679 | 6/1983 |
| JP | A-60-126545 | 7/1985 |
| JP | A-61-27466 | 2/1986 |
| JP | A-3-164661 | 7/1991 |
| JP | A-H04-92714 | 3/1992 |
| JP | A-H05-66071 | 3/1993 |
| JP | A-H06-50615 | 2/1994 |
| JP | A-H07-280362 | 10/1995 |
| JP | A-H09-60986 | 3/1997 |
| JP | A-H10-185336 | 7/1998 |
| JP | A-H11-190561 | 7/1999 |
| JP | A-2000-213826 | 8/2000 |
| WO | WO 98/49502 | 11/1998 |

* cited by examiner

*Primary Examiner*—Melvin Jones
(74) *Attorney, Agent, or Firm*—Harness, Dickey & Pierce, PLC

(57) ABSTRACT

A first heat exchange unit is for condensing a refrigerant discharged from a compressor. A second heat exchange unit is provided downstream from the first heat exchange unit. A gas-liquid separator, into which part of the refrigerant from the compressor and part of the refrigerant from the first exchange unit flow, is for separating the refrigerants into a gas and a liquid refrigerant to accumulate the liquid refrigerant. The gas refrigerant in the separator is lead to the second heat exchange unit. A primary refrigerant flow path, included in the first heat exchange unit, is for leading the refrigerant to the second heat exchange unit. A branch refrigerant flow path, included in the first heat exchange unit and independently partitioned from the primary refrigerant flow path, is for leading the refrigerant to the separator.

5 Claims, 6 Drawing Sheets

FIG. 3A
HIGH FLOW

FIG. 3B
LOW FLOW

FIG. 3C
RELATED ART
HIGH FLOW

FIG. 3D
RELATED ART
LOW FLOW

RELATED ART

FIG. 7 RELATED ART

REFRIGERANT CYCLE SYSTEM AND CONDENSER

CROSS REFERENCE TO RELATED APPLICATIONS

This application is based on and incorporates herein by reference Japanese Patent Application No. filed on Mar. 22, 2002.

FIELD OF THE INVENTION

The present invention relates to a refrigerant cycle system and its condenser, both of which are suitable for air conditioning of a vehicle and the like. In particular, they are capable of properly controlling a circulating refrigerant by varying an amount of a liquid refrigerant accumulated in a gas-liquid separator even when a flow amount of the circulating refrigerant decreases.

BACKGROUND OF THE INVENTION

Inventors of the present invention proposed a refrigerant cycle system to control a super-heating degree of a refrigerant at an outlet of an evaporator in U.S. Pat. No. 6,427,480. The system in a related art in the above patent is different from a conventional receiver refrigerant cycle system and a conventional accumulator refrigerant cycle system.

Figure 6:
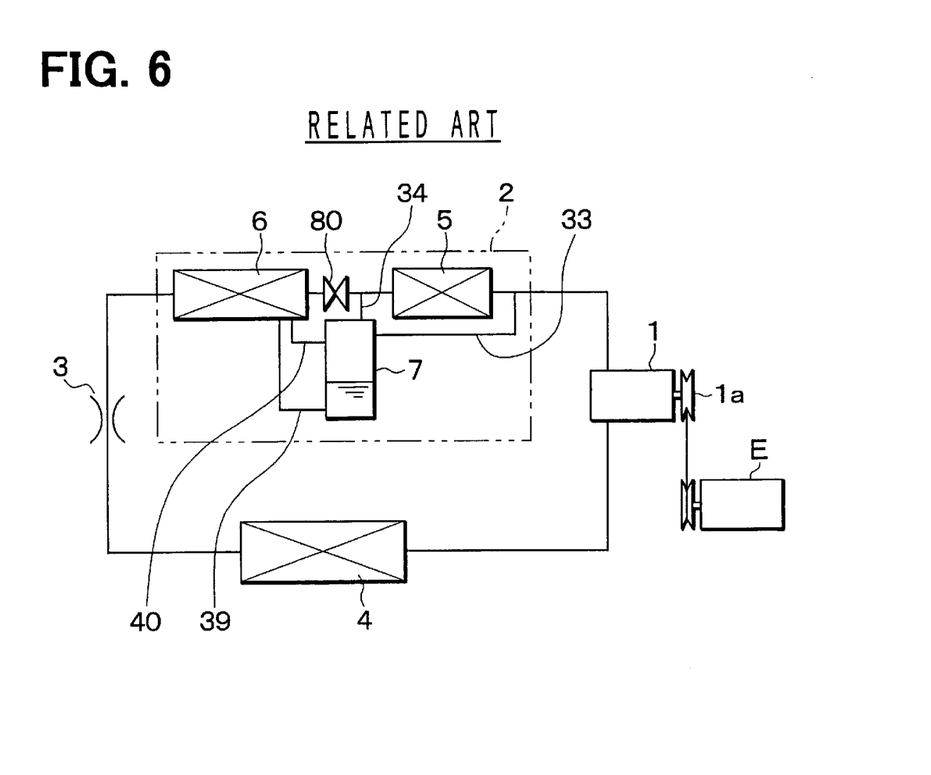
FIG. 6 is a basic structural diagram of a refrigerant cycle according to the related art.
Figure 7:
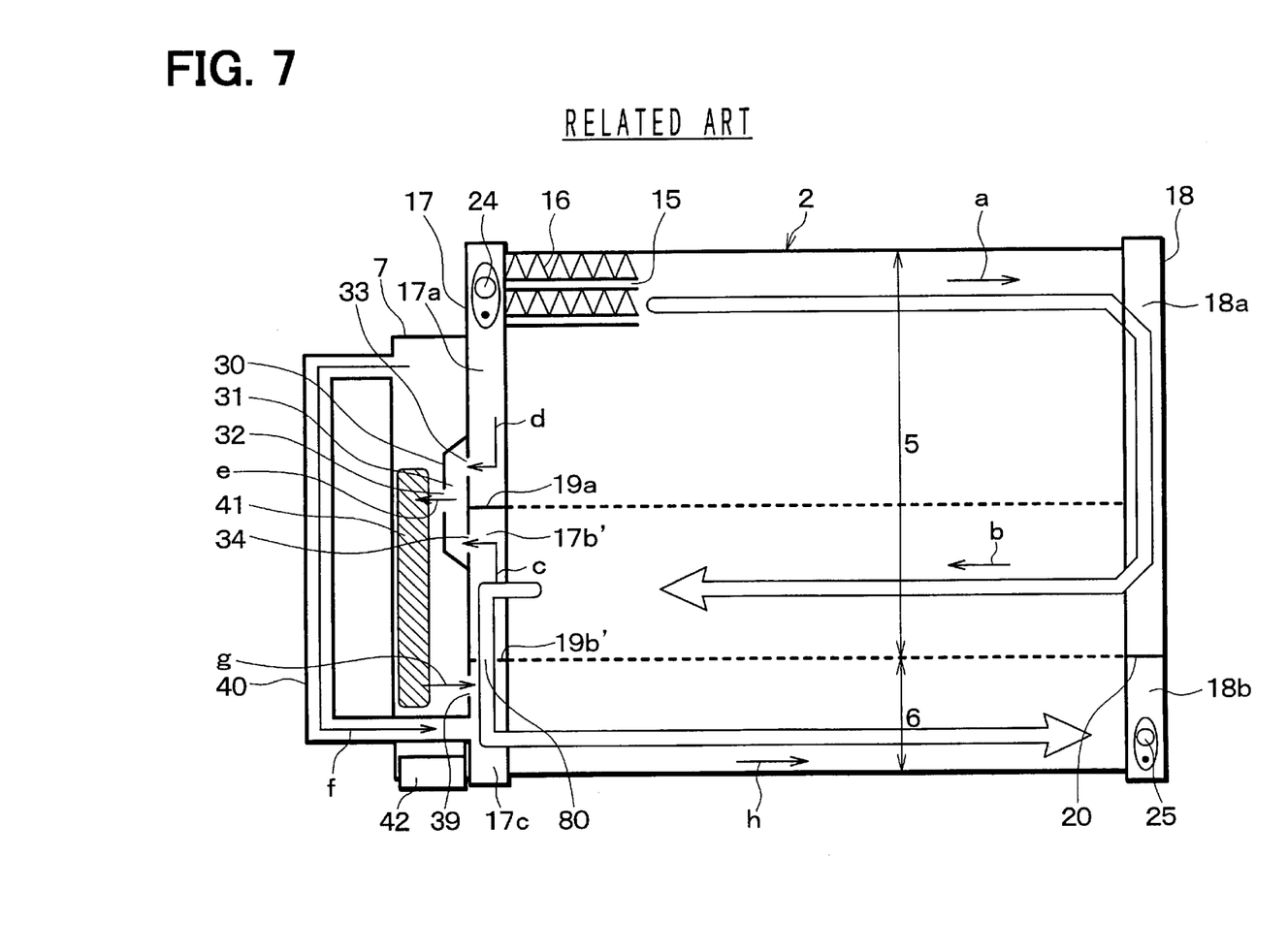
FIG. 7 is a schematic sectional view of a separator-integrated condenser according to the related art.

In detail, basic structure of the refrigerant cycle system in the related art is shown in FIG. 6. Structure of a condenser 2 in the refrigerant cycle system is shown in FIG. 7. The condenser 2 includes a first heat exchange unit 5 and a second heat exchange unit 6. Both ends of tubes 15 included in the two heat exchange units 5, 6 communicate with a first and a second header tanks 17, 18, which are separately disposed in right and left sides of the two heat exchange units 5, 6. The first header tank 17 includes an inlet joint 24 into which a refrigerant discharged from a compressor 1. The first header tank 17 is furthermore integrated with a gas-liquid separator 7. A gas refrigerant bypass path 33 is provided to fluidly intermediate between an upper space 17a of the first header tank 17 and a mixing chamber 31 within the gas-liquid separator 7. The gas refrigerant bypass path 33 enables a separated part of the refrigerant discharged through the inlet joint 24 to directly flow into the mixing chamber 31.

A refrigerant inlet path 34 is provided for a separated part of a liquid refrigerant condensed in the first heat exchange unit 5 to flow into the mixing chamber 31 from an intermediate space 17b' of the first header tank 17.

A gas return communication path 40 and a liquid return communication path 39 are provided for a gas refrigerant and a liquid refrigerant in the gas-liquid separator 7 to return to a lower space 17c of the first header tank 17. A restrictor 80 is provided between the intermediate space 17b' and the lower space 17c. Here, the intermediate space 17b' is a branching point to the refrigerant inlet path 34, and the lower space 17c is a converging point of the gas return communication path 40 and the liquid return communication path 39. The restrictor 80 is formed in a lower partition plate 19b' disposed within the first header tank 17.

Pressure difference is generated between both the sides of the restrictor 80. This causes a part of a liquid refrigerant that is in middle of a condenser refrigerant flow path (in the intermediate space 17b') to move to the gas-liquid separator 7 through the refrigerant inlet path 34. It also leads the gas refrigerant and liquid refrigerant in the gas-liquid separator 7 to the lower space 17c.

In the related art, a part of the refrigerant discharged from the compressor 1 is directly introduced to the gas-liquid separator 7 and mixed with the liquid refrigerant from the refrigerant inlet path 34. The liquid refrigerant is then separated from the gas refrigerant so as to be accumulated in the bottom of the gas-liquid separator 7. This structure varies dryness degree of a refrigerant flowing into the gas-liquid separator 7 according to super-heating degree of the refrigerant discharged from the compressor 1. A accumulated amount of the liquid refrigerant accumulated in the gas-liquid separator 7 is thereby controlled based on the super-heating degree of the refrigerant discharged from the compressor 1. The control of the accumulated amount of the liquid refrigerant leads to control of a flow amount of a circulating refrigerant within the cycle. This results in controlling the super-heating degree of the refrigerant discharged from the compressor 1, and furthermore super-heating degree of a refrigerant at an outlet of an evaporator 4.

As explained above, in the refrigerant cycle of the related art, the control of the accumulated amount of the liquid refrigerant leads to the control of the super-heating degree of the refrigerant at the outlet of the evaporator 4. A fixed restrictor or a variable restrictor that responds to state of a high-pressure refrigerant can be therefore adopted as a decompression device 3. In comparison with the known receiver cycle, there is an advantage in eliminating an expensive and complicatedly-structured thermal expansion valve that is necessary as the decompression device in the receiver cycle.

The known accumulator cycle is equipped with an accumulator in an outlet of an evaporator (at a lower pressure side of the cycle). In comparison with the accumulator cycle, installing of the gas-liquid separator 7 at a higher pressure side of the cycle enables the gas-liquid separator 7 to be downsized due to a small specific volume of the refrigerant at the higher pressure. Furthermore, the circulating flow amount of the refrigerant within the cycle can be controlled in direct response to the super-heating of the refrigerant discharged from the compressor 1. Thereby the circulating flow amount is properly controlled, and cycle efficiency is enhanced in comparison with the accumulator cycle.

In the refrigerant cycle of the above related art, as an experimental result, it is observed that a control characteristic of the flow amount of the refrigerant worsens when the circulating flow amount of the refrigerant within the cycle is small. Here, being small of the circulating flow amount of the refrigerant is comparable to being low of a revolution speed of the compressor 1 or being low of a heat load of cooling of the evaporator 4.

Figure 3A:
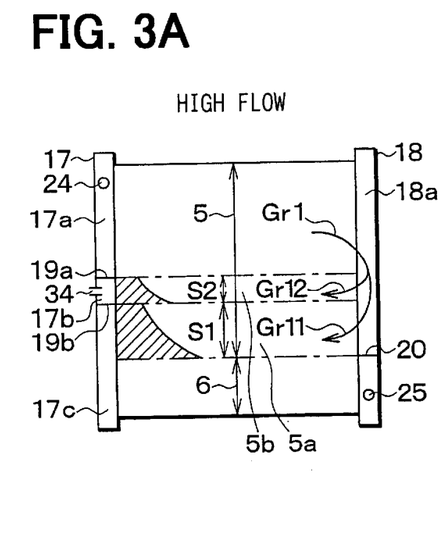
FIGS. 3A and 3B are diagrams explaining operation according to the first embodiment.
Figure 3B:
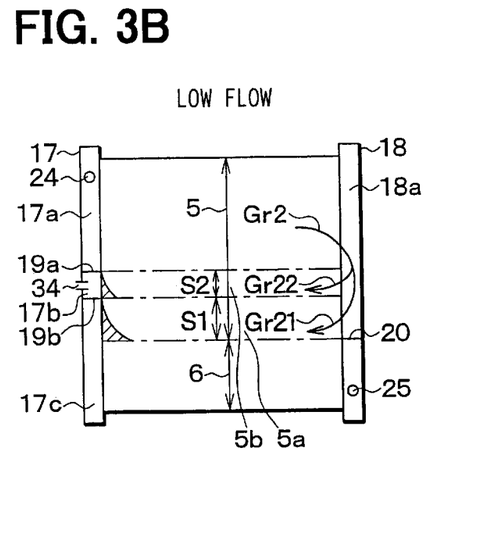
Figure 3C:
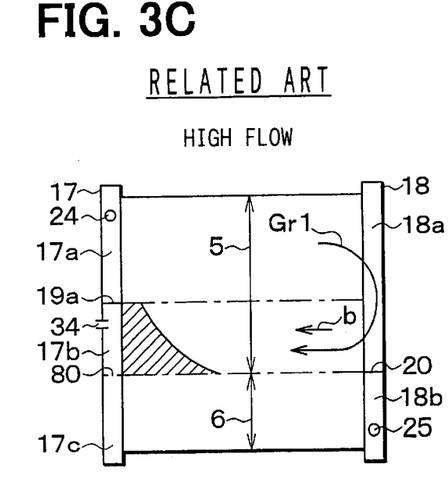
FIGS. 3C and 3D are diagrams explaining operation according to a related art.

In detail, when the circulating flow amount of the refrigerant is large, as shown in FIG. 3C, a liquid refrigerant (shaded part) condensed in a lower path (in a refrigerant flow of arrow b) of the first heat exchange unit 5 is increased. Liquid refrigerant ratio in the intermediate space 17b' is thereby increased. The pressure difference generated between both sides of the restrictor 80 hence leads the liquid refrigerant in the intermediate space 17b' to the gas-liquid separator 7 through the refrigerant inlet path 34. Here, being large of the circulating flow amount of the refrigerant is comparable to being high of the revolution speed of the compressor 1 or being high of the heat load of the cooling of the evaporator 4.

Figure 3D:
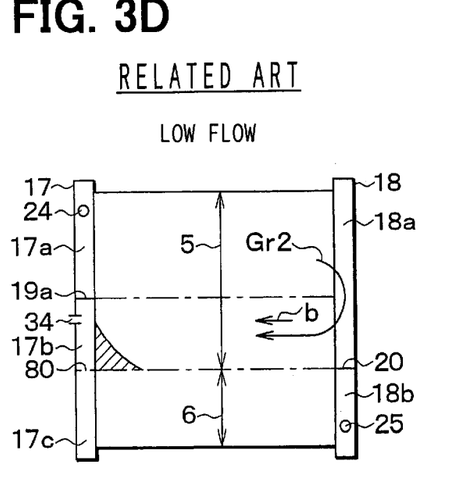

By contrast, when the circulating flow amount of the refrigerant is small, as shown in FIG. 3D, a liquid refrigerant (shaded part) condensed in the lower path (in the refrigerant flow of arrow b) of the first heat exchange unit 5 is decreased. The liquid refrigerant ratio in the intermediate space 17b' is thereby decreased. The liquid refrigerant in the intermediate space 17b' is thereby less likely lead to the gas-liquid separator 7 through the refrigerant inlet path 34.

As a result, when the circulating flow amount of the circulating refrigerant is small, the accumulated amount of the liquid refrigerant in the gas-liquid separator 7 is excessively decreased in relation to the super-heating degree of the refrigerant discharged from the compressor 1. Thereby the refrigerant circulating within the cycle is balanced in an excessively large amount in relation to the heat load of the cooling. The excessive large amount of the circulating refrigerant leads to decrease of the super-heating of the refrigerant at the outlet of the evaporator 4, which results in compressing the liquid refrigerant in the compressor 1.

SUMMARY OF THE INVENTION

An object of the present invention is to provide a refrigerant cycle system capable of properly controlling a circulating refrigerant even when a flow amount of the circulating refrigerant decreases.

To achieve the above object, a refrigerant cycle system is provided with the following. A first and second heat exchange units are serially disposed. A gas-liquid separator is disposed for accepting a part of a refrigerant discharged from a compressor and a part of a refrigerant from the first exchange unit to separate the flowing refrigerants into a gas and liquid refrigerants. A primary refrigerant flow path is included in the first heat exchange unit for leading a refrigerant to the second heat exchange unit, while a branch refrigerant flow path is included in the first heat exchange unit and independently separated from the primary refrigerant flow path for leading a refrigerant to the gas-liquid separator.

This structure enables the refrigerant that passes through the branch refrigerant flow path to directly flow into the gas-liquid separator. Thereby, even in operation condition where a flow amount of a circulating refrigerant decreases, the liquid refrigerant condensed in the branch refrigerant flow path is securely lead to the gas-liquid separator. Consequently, an amount of the liquid refrigerant is properly accumulated in the gas-liquid separator in correspondence with super-heating degree of the refrigerant discharged from the compressor. Thereby the flow amount of the refrigerant circulating within the cycle is properly controlled according to heat load of cooling. Furthermore, a restrictor in a related art becomes dispensable, which causes pressure loss in the restrictor to be decreased at a high flow amount. The circulating flow amount thereby increases to enhance cooling capability of the refrigerant system.

In one embodiment of the invention, tubes are disposed in parallel with each other inside the heat exchange units while fluidly intermediating between the respective header tanks. Here, the branch refrigerant flow path is separated from the primary refrigerant flow path due to a partition plate disposed inside one of the header tanks. This enables the branch refrigerant flow path to be easily formed with the partition plate inside the header tank.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
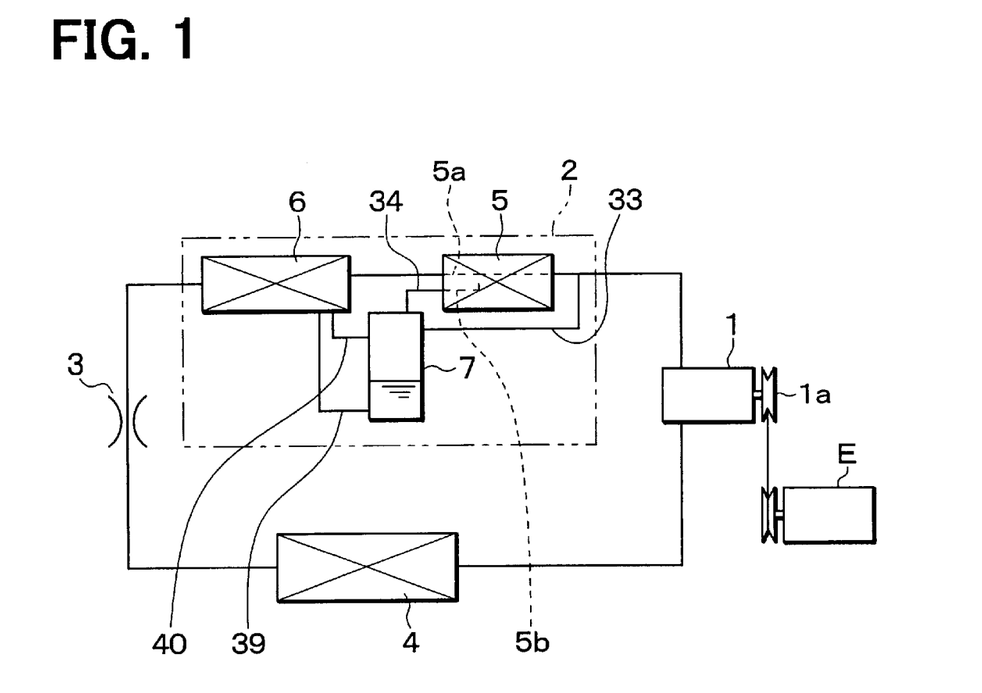
FIG. 1 is a basic structural diagram of a refrigerant cycle according to a first embodiment of the present invention.
Figure 2:
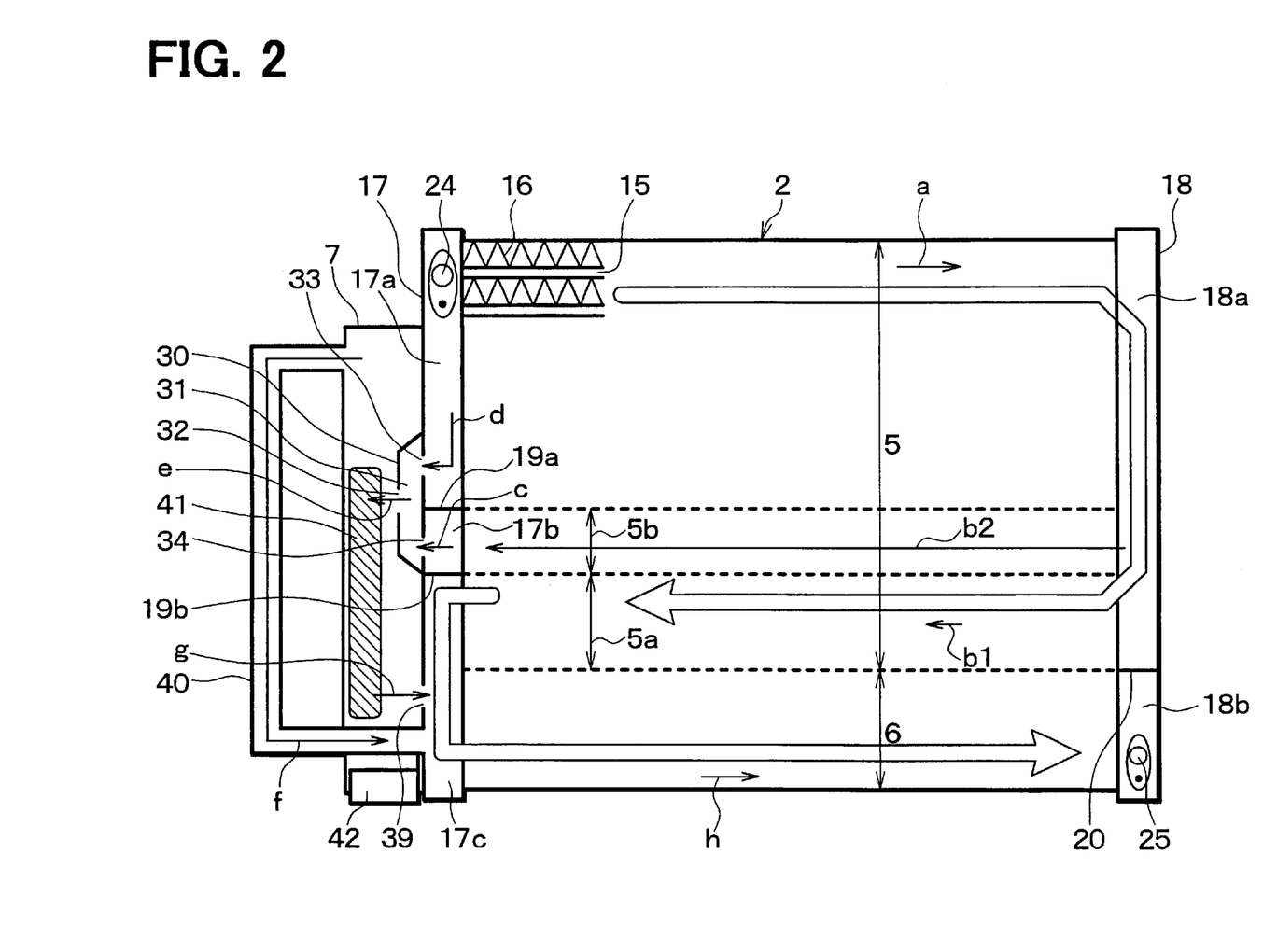
FIG. 2 is a schematic sectional view of a separator-integrated condenser according to the first embodiment.

FIG. 1 shows a basic structural diagram of a refrigerant cycle system, which is suitable for air conditioning of a vehicle, according to a first embodiment. FIG. 2 is a schematic sectional view of a separator-integrated condenser according to the first embodiment.

A compressor 1 is belt-driven by a vehicle engine E through an electromagnetic clutch 1a. High-pressure gas refrigerant discharged from the compressor 1 flows into a condenser 2 where the gas refrigerant heat-exchanges with outside air to be cooled and condensed. The condenser 2 is disposed in a region to be cooled by receiving a traveling wind caused by traveling of the vehicle, concretely in the forefront or the like within a vehicle engine room, to be cooled by the traveling wind and air blown from a cooling fan (not shown).

A decompression device 3 is used for decompressing the refrigerant passed through the condenser 2 into a low-pressure gas-liquid two-phase state. In the present embodiment, the decompression device 3 is a fixed restrictor (fixed throttle) such as an orifice, a nozzle, and a capillary tube.

An evaporator 4 evaporates the low-pressure refrigerant from the decompression device 3 by absorbing heat from air blown from an air conditioning blower (not shown). The evaporator 4 is disposed within a case (not shown) of an interior air conditioner, and cool air cooled by the evaporator 4 is temperature-adjusted in a heater core portion (not shown) and thereafter is blown out into a passenger compartment of the vehicle. The gas refrigerant evaporated in the evaporator 4 is sucked into the compressor 1.

The condenser 2 has a first heat exchange unit 5 and a second heat exchange unit 6 which are provided in order of a refrigerant flowing direction. The condenser 2 is integrated with a gas-liquid separator 7 for separating gas-liquid of a refrigerant. The gas-liquid separator 7 is basically disposed, in the order of the refrigerant flowing direction, between the first heat exchange unit 5 and the second heat exchange unit 6.

Referring to FIG. 2, detailed composition of the condenser 2 will be explained below. The condenser 2 has a heat exchange portion including a plurality of flat tubes 15 extending in the horizontal direction to define refrigerant flow paths, and corrugate fins 16 connected to the flat tubes 15. The first heat exchange unit 5 is constructed at the upper part of the heat exchange portion of the condenser 2, and the second heat exchange unit 6 is constructed at the lower part of the heat exchange portion.

On the lateral sides of these both heat exchange units 5, 6, a first and a second header tanks (side tanks) 17 and 18 extending in the vertical direction are disposed. The left and right ends of the flat tubes 15 are communicated to the interiors of the first and second header tanks 17 and 18, respectively.

The first header tank 17 has an internal space being partitioned into an upper space 17a, intermediate space 17b, and lower space 17c by two partition plates 19a, 19b. The second header tank 18 has an internal space being partitioned into an upper space 18a and lower space 18b by one partition plate 20.

In the upper end area of the first header tank 17, an inlet joint 24 constituting a refrigerant inlet is jointed to accept a refrigerant discharged from the compressor 1 into the upper space 17a of the condenser 2. In the lower end area of the second header tank 18, an outlet joint 25 constituting a refrigerant outlet is jointed to send out the refrigerant in the lower space 18b of the second header tank 18 to an outside of the condenser 2, namely to the decompression device 3.

The gas-liquid separator 7, having a long and narrow tank shape extending in the vertical direction, is integrally jointed to the first header tank 17 that has the inlet joint 24. The first and second heat exchange units 5, 6, the header tanks 17, 18, the gas-liquid separator 7 are formed of aluminum and assembled into single-piece integrated structure by a brazing method.

Connection relation between the gas-liquid separator 7 and refrigerant flow paths within the condenser 2 will be explained below. A mixing chamber 31 vertically extending is formed by being partitioned with a partition wall 30 within the gas-liquid separator 7. The mixing chamber 31 communicates with an upper space (a gas refrigerant zone) of the gas-liquid separator 7 through an outlet hole 32. The mixing chamber 31 also communicates with the upper space 17a of the first header tank 17 through a gas refrigerant bypass path 33 and with the intermediate space 17b of the first header tank 17 through a refrigerant inlet path 34.

Thereby a part of the refrigerant discharged from the compressor 1 (compressor discharge refrigerant) through the inlet joint 24 is branched and directly introduced into the mixing chamber 31 through the gas refrigerant bypass path 33 in the upper space 17a of the first header tank 17 as shown in arrow d in FIG. 2. A part of the condensed liquid refrigerant that flows into the intermediate space 17b is introduced to the mixing chamber 31 through the refrigerant inlet path 34 as shown in arrow c of FIG. 2. Therefore the compressor discharge refrigerant (super-heated gas refrigerant) and the liquid refrigerant are mixed in the mixing chamber 31. Here, the gas refrigerant bypass path 33 and the refrigerant inlet path 34 are formed of through-holes penetrating a wall between the gas-liquid separator 7 and the first header tank 17.

Partition structure of the internal spaces of the first header tank 17 will be explained below. The upper partition plate 19a is the same as the upper partition plate 19a of the related art (FIG. 7). By contrast, the lower partition plate 19b is completely different from the lower partition plate 19b' of the related art.

That is, the lower partition plate 19b of the first embodiment of the present invention is, at first, a pure partition plate having no fixed restrictor. At second, the lower partition plate 19b is for forming a branch refrigerant flow path 5b used only for the liquid refrigerant that is to flow into the gas-liquid separator 7 by being partitioned from a primary refrigerant flow path 5a of the first heat exchange unit 5. The lower partition plate 19b is therefore disposed upper than the lower partition plate 19b' of the related art and much closer to the upper partition plate 19a.

The refrigerant that is directly introduced into the mixing chamber 31 (gas-liquid separator 7) through the gas refrigerant bypass path 33 is a branch flow separated from the compressor discharge refrigerant. This branch flow has a flow amount of much less than a primary refrigerant flow. Therefore a flow amount in the above branch refrigerant flow path 5b is set to much less than that in the primary refrigerant flow path 5a in response to the branch flow of the compressor discharge refrigerant. The piled number of the tubes 15 in the branch refrigerant flow path 5b is from two to six, while the piled number of the tubes 15 in the primary refrigerant flow path 5a is from six to fourteen. Here, the tubes are piled vertically in FIG. 2. As a result, the lower partition plate 19a is much closer to the upper partition plate 19a in comparison with that of the related art.

In this embodiment, determining disposition of the lower partition plate 19b defines ratio of a flow area between the branch refrigerant flow path 5b and the primary refrigerant flow path 5a to determine the branch flow amount of the branch refrigerant flow path 5b. A hole diameter of the refrigerant inlet path 34 can be thereby increased in comparison to that of the related art. In the related art, the hole diameter of the refrigerant inlet path directly affects the flow amount of the liquid refrigerant flowing into the gas-liquid separator 7, so that the hole diameter is narrowed down to 1 mm. By contrast, in this embodiment, the hole diameter can be set as large as not less than 2 mm, e.g., 3 mm. This hole diameter of the refrigerant inlet path 34 is much larger than that of the liquid return communication path 39.

This liquid return communication path 39 is formed of a through-hole penetrating a wall between the gas-liquid separator 7 and the first header tank 17. A flow area of this communication path 39 is much less (e.g., diameter: 1 mm) than that of the above refrigerant inlet path 34 and a gas return communication path 40 to be described below. The communication path 39 fluidly intermediates between the lower space of the gas-liquid separator 7 and the lower space 17c of the first header tank 17. Through the communication path 39, the liquid refrigerant accumulated in the gas-liquid separator 7 can return by slow degrees to the lower space 17c of the first header tank 17. Here, since the liquid refrigerant accumulated in the gas-liquid separator 7 dissolves lubricating oil of the compressor 1, returning of the liquid refrigerant to the refrigerant to be circulated in the cycle through the communication path 39 enables the oil to constantly return to the compressor 1.

The upper space of the gas-liquid separator 7 communicates with the lower space 17c of the first header tank 17 through the gas return communication path 40. The gas refrigerant in the upper space of the separator 7 can be thereby constantly returned to the lower space 17c of the first header tank 17. The gas return communication path 40 in the embodiment is formed of a pipe provided outside the gas-liquid separator 7.

A desiccant 41 adsorbing moisture in the refrigerant is disposed within the gas-liquid separator 7. The desiccant 41 is inserted to an interior of the gas-liquid separator 7 through a bottom opening of the gas-liquid separator 7 after the condenser 2 including the gas-liquid separator 7 is assembled by the brazing method. The bottom opening is sealed to be airtight with a cap 42 that is fixed to the bottom opening with a screw cramp via an elastic sealing agent.

An operation of the first embodiment in the above structure will be explained below. The compressor discharge refrigerant enters the inlet joint 24, and passes horizontally through the upper space 17a of the first header tank 17 and the flat tubes 15 in the upper half of the first heat exchange unit 5, as shown in arrow a of FIG. 2. The refrigerant then flows into the upper space 18a of the second header tank 18 and U-turns. The refrigerant in the upper space 18a is divided into two flows, as shown in arrow b1 and b2, due to the lower partition plate 19b of the first header tank 17.

That is, the lower partition plate 19b enables the flat tubes of the lower half of the first heat exchange unit 5 to be divided into a group of the tubes for the primary refrigerant flow path 5a and a group of the tubes for the branch refrigerant flow path 5b. Thereby the refrigerant is divided into two flows that a primary refrigerant flow b1 passing through the group of the tubes for the primary refrigerant flow path 5a and a branch refrigerant flow b2 passing through the group of tubes for the branch refrigerant flow path 5b.

In usual cycle operation condition, the compressor discharge refrigerant is cooled by the outside air and condensed while it passes through a U-turn shaped refrigerant flow path of the first heat exchange unit 5. Therefore the liquid refrigerant condensed after passing through the primary refrigerant flow path 5a flows directly into the lower space 17c of the first header tank 17. The liquid refrigerant condensed after passing through the branch refrigerant flow path 5b also flows into the intermediate space 17b. Depending on the cycle operation condition, a refrigerant mixture of two gas-liquid phases with a predetermined dryness degree sometimes sometimes enters the lower space 17c or the intermediate space 17b.

The liquid refrigerant that flowed into the intermediate space 17b (branch refrigerant flow) is introduced into the mixing chamber 31 through the refrigerant inlet path 34 as shown in arrow c. The part of the compressor discharge refrigerant from the inlet joint 24 is introduced into the mixing chamber 31 through the upper space 17a of the first header tank 17 and the gas refrigerant bypass path 33 as shown in arrow d. Thus the part of the compressor discharge refrigerant and the part of the liquid refrigerant condensed in the first heat exchange unit 5 are mixed in the mixing chamber 31 to flow into the upper space of the gas-liquid separator 7 through the outlet hole 32 of the mixing chamber 31 as shown in arrow e.

In the gas-liquid separator 7 the gas and liquid refrigerants are separated from each other due to density difference, so that the liquid refrigerant is accumulated in the lower space of the gas-liquid separator 7 and the gas refrigerant is collected in the upper space of the gas-liquid separator 7. The gas refrigerant in the gas-liquid separator 7 flows into the lower space 17c of the first header tank 17 through the gas return communication path 40 as shown in arrow f. By contrast, the liquid refrigerant downward in the gas-liquid separator 7 flows also into the lower space 17c of the first header tank 17 through the liquid return communication path 39 as shown in arrow g.

Hence, three refrigerants of the refrigerant from the primary refrigerant flow path 5a, the gas refrigerant from the gas-liquid separator 7, and the liquid refrigerant from the gas-liquid refrigerant 7 converge into the lower space 17c. These refrigerants are mixed in the lower space 17c and pass through the flat tubes in the second heat exchange unit 6 with radiating heat to the outside air, as shown in arrow h, to be moved into a super-cooled state. The super-cooled liquid refrigerant flows into the lower space 18b of the second header tank 18 and gets out from the outlet joint 25 to the decompression device 3.

Through the above operation, the part of the liquid refrigerant (or mixture of two gas-liquid phases) cooled and condensed after passing through the first heat exchange unit 5 and the part of the compressor discharge refrigerant from the inlet joint 24 are mixed and heat-exchanged with each other in the mixing chamber 31. The mixed refrigerant flows into the gas-liquid refrigerant 7 through the outlet hole 32 and then is divided into two phases of gas and liquid with dryness degree corresponding to the super-heating degree of the compressor discharge refrigerant.

As a result, an amount of the liquid refrigerant accumulated in the gas-liquid separator 7 corresponds to the super-heating degree of the compressor discharge refrigerant. In other words, the amount of the liquid refrigerant accumulated in the separator 7 can be controlled in response to change of the super-heating degree of the compressor discharge refrigerant. The control of the amount of the refrigerant leads to control of the super-heating degree of the compressor discharge refrigerant.

In detail, while a high cooling load such in summer, super-heating degree of the compressor discharge refrigerant increases with increasing super-heating degree of a evaporator outlet refrigerant. A gas refrigerant with high super-heating degree thereby flows into the mixing chamber 31 through the gas refrigerant bypass path 33.

Introduction of the high temperature refrigerant with the high super-heating degree enhances evaporation of the liquid refrigerant from the refrigerant inlet path 34. This results in decreasing the amount of the refrigerant accumulated in the separator 7. Thereby an amount of the gas refrigerant returned to the condenser 2 through the gas return communication path 40 is increased, so that the flow amount of the refrigerant circulating within the cycle is increased to decrease the super-heating degree of the evaporator outlet refrigerant.

By contrast, in condition where the cooling load is low and the super-heating degree of the evaporator outlet refrigerant is around zero, or a liquid refrigerant returns to the compressor 1, the super-heating degree of the compressor discharge refrigerant decreases. Thereby the evaporation of the liquid refrigerant by the refrigerant from the gas refrigerant bypass path 33 is depressed, and the dryness degree of the refrigerant flowing into the gas-liquid separator 7 is decreased. The amount of the liquid refrigerant accumulated in the gas-liquid separator 7 is increased, so that the circulating amount of the refrigerant within the cycle is decreased.

If the accumulation of the liquid refrigerant in the gas-liquid separator 7 causes again shortage of the circulating amount of the refrigerant, subsequent increase of the super-heating degree of the compressor discharge refrigerant is fed back to the interior of the gas-liquid separator 7. This feedback enables the amount of the liquid refrigerant accumulated in the gas-liquid separator 7 to decrease. The circulating amount of the refrigerant is thereby increased.

As explained above, the direct introduction of the refrigerant through the gas refrigerant bypass path 33 enables the change of the super-heating degree of the compressor discharge refrigerant to be responsively fed back to the control of the amount of the refrigerant accumulated in the gas-liquid separator 7. Hence, the control of the amount of the liquid refrigerant leads to the control of the circulating amount of the refrigerant within the cycle, and the control of the super-heating degree of the compressor discharge refrigerant. A compression process of refrigerant in the compressor 1 is basically an isentropic change. Therefore the control of the super-heating degree of the compressor discharge refrigerant leads to the control of the super-heating degree of the evaporator outlet refrigerant.

In the related art shown in FIGS. 6 and 7, as explained above, when the circulating amount of the refrigerant within the cycle decreases, the amount of the liquid refrigerant condensed in a lower part of a flow path in a first heat exchange unit 5 (refrigerant flow shown in arrow b of FIG. 7) decreases as shown in FIG. 3D. Ratio of the liquid refrigerant in an intermediate space 17b' decreases accordingly. Introduction of the liquid refrigerant into the gas-liquid separator 7 through the refrigerant inlet path 34 is depressed. This decreases excessively the amount of the refrigerant accumulated in the gas-liquid separator 7 in relation with the super-heating degree of the compressor discharge refrigerant.

By contrast, in this embodiment, a refrigerant flow path corresponding to the lower part of the path (shown in arrow b in FIG. 7) of the first heat exchange unit 5 is divided into the primary refrigerant flow path 5a and the branch refrigerant flow path 5b using the lower partition plate 19b in the first header tank 17. Here, pressure loss in the primary refrigerant flow path 5a and branch refrigerant flow path 5b of the first heat exchange unit 5 is much greater than that of a turning part in the lower space 17a deriving from the primary refrigerant flow path 5a, and the refrigerant inlet path 34, outlet hole 32 and the like deriving from the branch refrigerant flow path 5b.

Ratio of refrigerant flow areas (S1/S2) of the primary and branch flow paths 5a, 5b, i.e., ratio of the piled numbers of the tubes, therefore almost defines ratio of refrigerant flow amounts of both flow paths 5a, 5b. This ratio of refrigerant flow amounts is hardly affected by the varying circulating refrigerant amount within the cycle.

Accordingly, ratio (Gr12/Gr11) of a refrigerant amount Gr11 in a primary refrigerant flow path 5a and a refrigerant amount Gr12 in a branch refrigerant flow path 5b at a high flow amount (total circulating amount=Gr1) shown in FIG. 3A is almost same as ratio (Gr22/Gr21) of a refrigerant amount Gr21 in a primary refrigerant flow path 5a and a refrigerant amount Gr22 in a branch refrigerant flow path 5b at a low flow amount (total circulating amount=Gr2) shown in FIG. 3B.

As shown in FIG. 3B, liquid refrigerants condensed in the refrigerant flow paths 5a, 5b decreases at the low flow amount. However, the intermediate space 17b and the refrigerant inlet path 34 are dedicated for supply the refrigerant to the gas-liquid separator 7, so that the liquid refrigerant condensed in the branch refrigerant flow path 5b is directly introduced to the gas-liquid separator 7 through the intermediate space 17b.

As a result, even in condition where the circulating amount of the refrigerant decreases, the liquid refrigerant condensed in the branch refrigerant flow path 5b can be securely introduced to the gas-liquid separator 7. The amount of the liquid refrigerant accumulated in the separator 7 corresponds to the super-heating degree of the compressor discharge refrigerant. This corresponding amount of the liquid refrigerant leads to appropriate control of the circulating amount of the refrigerant within the cycle depending on the heat load of the cooling.

The restrictor 80 in the related art becomes unnecessary, so that the pressure loss at the restrictor 80 during the high flow amount can be avoided. This results in increasing the circulating flow amount of the refrigerant and enhancing cooling capability of the refrigerant cycle.

In the related art, lowering opening position of the refrigerant inlet path 34 can be conceivable to enhance introduction of the liquid refrigerant to the gas-liquid separator 7 during the low flow amount. However, this change leads to excessive introduction of the liquid refrigerant to the gas-liquid separator 7 during the high flow amount to result in unfavorable shortage of the circulating amount of the refrigerant within the cycle.

(Second Embodiment)

In the first embodiment, a primary refrigerant flow path of the condenser 2 is formed of flow paths of the flat tubes of the condenser 2 and interiors of the header tanks 17, 18. As shown in FIG. 2, the primary refrigerant flow path 5a and the branch refrigerant flow path 5b located downstream within the first heat exchange unit 5 therefore adjoin to the second heat exchange unit 6. By contrast, in a second embodiment, as shown in FIG. 4, a portion part located upstream within a first heat exchange unit 5 (portion flowing in arrow a of FIG. 4) adjoins to a second heat exchange unit 6.

Figure 4:
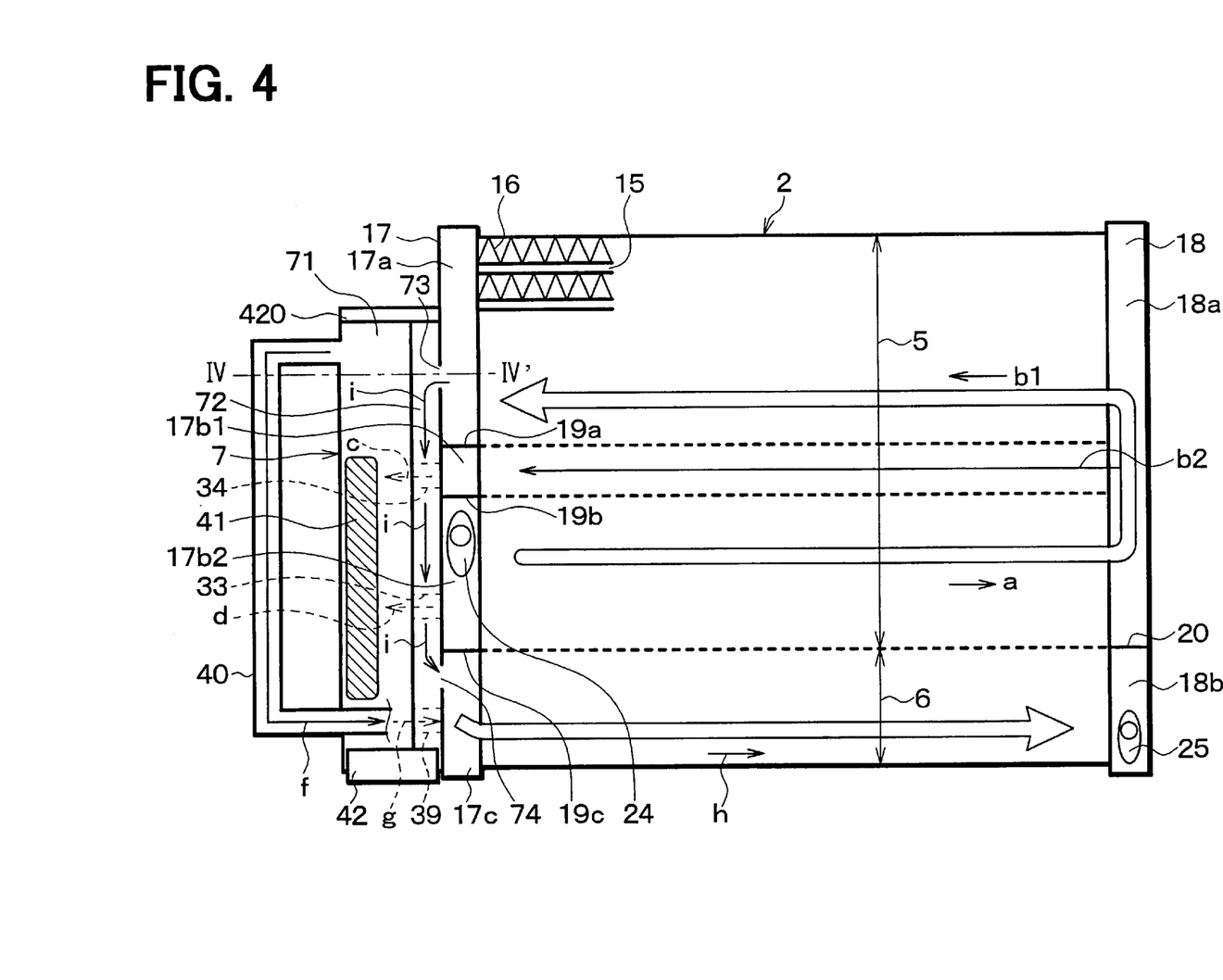
FIG. 4 is a schematic sectional view of a separator-integrated condenser according to a second embodiment.
Figure 5:
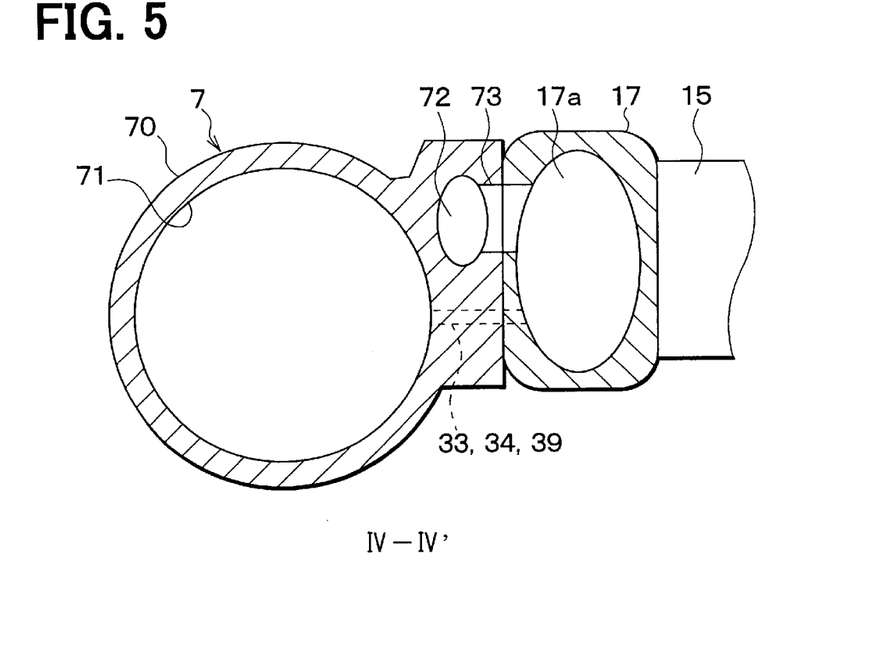
FIG. 5 is a sectional view taken from line IV–IV' in FIG. 4.

In the second embodiment, as shown in FIGS. 4 and 5, flexibility of designing layout of refrigerant flow paths is enhanced in comparison with that of the first embodiment. This is realized by integrally assembling of communication paths of primary refrigerant flow of a condenser 2 into a cylinder body 70 of a gas-liquid separator 7.

In detail, the cylinder body 70 of the gas-liquid separator 7 is a cylinder body vertically extending. The cylinder body 70 includes a first through-bore 71 and a second through-bore 72. The first through-bore 71 is a hollow cylinder vertically extending in FIG. 4. The through-bore 72, being along the side of the thorough-bore 71, is a narrower hollow cylinder than the first through-bore 71.

The first and second through-bores 71, 72 are extending in parallel with each other. The cylinder body 70 having the first and second through-bores 71, 72 is integrally formed by being extruded from aluminum cylinder material.

The first through-bore 71 forms space for gas-liquid separation of the gas-liquid separator 7, and contains a desiccant 41 for adsorbing moisture of a refrigerant. The second through-bore 72 forms a sub communication path that fluidly intermediates between the first heat exchange unit 5 and second heat exchange unit 6 of the condenser 2.

An interior of a first header tank 17 is partitioned vertically into four spaces 17a, 17b1, 17b2, 17c with three partition plates 19a, 19b, 19c. An inlet joint 24 is provided to be communicated with the intermediate space 17b2 located thirdly from the top. Therefore a gas refrigerant bypass path 33 penetrates a wall between the cylinder body 70 and the first header tank 17 to fluidly intermediate between an interior space within the first through-bore 71 and the intermediate space 17b2.

A refrigerant inlet path 34 penetrates a wall between the cylinder body 70 and the first header tank 17 to fluidly intermediate between the interior space within the first through-bore 71 and the intermediate space 17b1 located secondly from the top. A liquid refrigerant return communication path 39 penetrates a wall between the cylinder body 70 and the first header tank 17 to fluidly intermediate between the lower interior space within the first through-bore 71 and the lower space 17c.

As shown in FIG. 5, a communication path 73 penetrates a wall between the cylinder body 70 and the first header tank 17 to fluidly intermediate between the upper end interior space within the second through-bore 72 and the upper space 17a of the first header tank 17. A communication path 74 (in FIG. 4) penetrates a wall between the cylinder body 70 and the first header tank 17 to fluidly intermediate between the lower end interior space within the second through-bore 72 and the lower space 17c of the first header tank 17.

That is, the upper space 17a and lower space 17c, both of which are located in the upper and lower ends of the first header tank 17, are communicated with each other through the second through-bore 72 (sub communication path). Arrow i indicates refrigerant flow in the second through-bore 72.

A bottom of the cylinder body 70 is sealed by fixing a cap 42, so that bottoms of the first and second through-bores 71, 72 are sealed. A top of the cylinder body 70 is integrally jointed with a cap 420, e.g., by the brazing method, so that tops of the first and second through-bores 71, 72 are sealed.

In the second embodiment, as shown in arrows a to i of FIG. 4, the refrigerant flow paths are formed to basically provide the same operation effect as the first embodiment. Furthermore, an upstream portion within the first heat exchange unit 5 (portion flowing in arrow a of FIG. 4) can be located in an intermediate position in a vertical direction of the first heat exchange unit 5. The downstream portion of the primary refrigerant flow path 5*a* and the branch refrigerant flow path 5*b* can be located in the uppermost position of the first heat exchange unit 5 in the vertical direction of FIG. 4.

In the second embodiment, disposing of the second through-bore 72 constituting the sub communication path extending within the cylinder body 70 of the gas-liquid separator 7 enhances design flexibility in layout of the refrigerant flow paths in the condenser 2 in comparison with the first embodiment.

In the second embodiment, a gas refrigerant through the gas refrigerant bypass path 33 and the liquid refrigerant through the refrigerant inlet path 34 are directly introduced into an interior (gas-liquid separation space) within the first through-bore 71. However, addition of a through-bore extending vertically within the cylinder body 70 enables a mixing path corresponding to the mixing chamber 31 of the first embodiment to be actualized.

Furthermore, addition of another through-bore extending vertically within the cylinder body 70 also enables a gas refrigerant return communication path 40 to be actualized.

What is claimed is:

1. A condenser in a refrigerant cycle system, the condenser comprising:
   a first heat exchange unit for condensing a refrigerant discharged from a compressor by radiating heat of the refrigerant;
   a second heat exchange unit provided downstream from the first heat exchange unit, wherein the refrigerant that passes through the first heat exchange unit flows into the second heat exchange unit, wherein each of the first heat exchange unit and the second heat exchange unit includes a plurality of tubes, constituting a refrigerant flow path, disposed in parallel with each other;
   first and second header tanks between which the first heat exchange unit and the second heat exchange unit are located, wherein one end of each of the plurality of the tubes is fluidly connected with the first header tanks while the other end of each of the plurality of the tubes is fluidly connected with the second header tanks; and
   a gas-liquid separator, integrated with the first header tank, for separating the refrigerant into a gas refrigerant and a liquid refrigerant to accumulate the liquid refrigerant,
   wherein a refrigerant inlet is provided in the first header tank for accepting the refrigerant discharged from the compressor,
   wherein a gas refrigerant bypass path is provided for leading, into the gas-liquid separator, a part of the refrigerant discharged from the compressor through the refrigerant inlet,
   wherein a gas return communication path is provided for leading the gas refrigerant in the gas-liquid separator to an inlet of the second heat exchange unit,
   wherein a primary refrigerant flow path is included in the first heat exchange unit for leading the refrigerant to the second heat exchange unit, and
   wherein a branch refrigerant flow path is included in the first heat exchange unit and independently separated from the primary refrigerant flow path for leading the refrigerant to the gas-liquid separator.

2. A condenser in a refrigerant cycle system according to claim 1,
   wherein the branch refrigerant flow path is separated from the primary refrigerant flow path due to a partition plate disposed inside the first header tank.

3. A condenser in a refrigerant cycle system according to claim 1,
   wherein the gas-liquid separator includes a sub communication path for providing a refrigerant flow path that fluidly intermediates between the first heat exchange unit and the second heat exchange unit.

4. A refrigerant cycle system comprising:
   a first heat exchange unit for condensing a refrigerant discharged from a compressor by radiating heat of the refrigerant;
   a second heat exchange unit provided downstream from the first heat exchange unit, wherein the refrigerant that passes through the first heat exchange unit flows into the second heat exchange unit; and
   a gas-liquid separator, into which a part of the refrigerant discharged from the compressor and a part of the refrigerant sent out from the first exchange unit flow, for separating the flowing refrigerants into a gas refrigerant and a liquid refrigerant and accumulating the liquid refrigerant, wherein:
   the gas refrigerant in the gas-liquid separator is lead to an inlet of the second heat exchange unit through a first flow path,
   the liquid refrigerant in the gas-liquid separator is led to the inlet of the second heat exchanging unit through a second flow path which is separated from the first flow path.
   a primary refrigerant flow path is included in the first heat exchange unit for leading the refrigerant to the second heat exchange unit, and
   a branch refrigerant flow path is included in the first heat exchange unit and independently separated from the primary refrigerant flow path for leading the refrigerant to the gas-liquid separator.

5. A refrigerant cycle system comprising:
   a first heat exchange unit for condensing a refrigerant discharged from a compressor by radiating heat of the refrigerant;
   a second heat exchange unit provided downstream from the first heat exchange unit, wherein the refrigerant that passes through the first heat exchange unit flows into the second heat exchange unit; and
   a gas-liquid separator, into which a part of the refrigerant discharged from the compressor and a part of the refrigerant sent out from the first exchange unit flow, for separating the flowing refrigerants into a gas refrigerant and a liquid refrigerant and accumulating the liquid refrigerant, wherein:
   the gas refrigerant in the gas-liquid separator is lead to an inlet of the second heat exchange unit,
   a primary refrigerant flow path is included in the first heat exchange unit for leading the refrigerant to the second heat exchange unit,
   a branch refrigerant flow path is included in the first heat exchange unit and independently separated from the primary refrigerant flow path for leading the refrigerant to the gas-liquid separator, each of the first heat exchange unit and the second heat exchange unit includes a plurality of tubes, constituting a refrigerant flow path, disposed in parallel with each other, one end of two ends of each of the plurality of the tubes is fluidly connected with the first header tank of two header tanks while the other end of the two ends of each of the plurality of the tubes is fluidly connected with a second header tank of the two header tanks, and the branch refrigerant flow path is separated from the primary refrigerant flow path due to a partition plate disposed inside one of the two header tanks.

* * * * *